(12) United States Patent
Katou (10) Patent No.: US 9,266,503 B2
(45) Date of Patent: Feb. 23, 2016

(54) VEHICULAR CONTROL SYSTEM AND PORTABLE TERMINAL

(75) Inventor: Kenji Katou, Miyoshi (JP)

(73) Assignee: DENSO CORPORATION, Kariya (JP)

( * ) Notice: Subject to any disclaimer, the term of this patent is extended or adjusted under 35 U.S.C. 154(b) by 551 days.

(21) Appl. No.: 13/616,116

(22) Filed: Sep. 14, 2012

(65) Prior Publication Data
US 2013/0090783 A1    Apr. 11, 2013

(30) Foreign Application Priority Data

Oct. 6, 2011  (JP) .................................. 2011-222213

(51) Int. Cl.
*G06F 17/00* (2006.01)
*B60R 25/24* (2013.01)
(52) U.S. Cl.
CPC ..................................... *B60R 25/24* (2013.01)
(58) Field of Classification Search
USPC ......... 701/2, 49; 340/426.13, 426.16, 426.17, 340/426.36, 5.61, 5.72, 10.1, 10.3
See application file for complete search history.

(56) References Cited

U.S. PATENT DOCUMENTS 6,552,649 B1    4/2003 Okada et al.
2006/0261925 A1*  11/2006 Baumgartner et al. ...... 340/5.62

FOREIGN PATENT DOCUMENTS

| JP | 2007-039989 | 2/2007 |
| JP | 2008-127777 | 6/2008 |
| JP | 2011-18988  | 1/2011 |

OTHER PUBLICATIONS

Office Action (1 page) dated Sep. 10, 2013, issued in corresponding Japanese Application No. 2011-222213 and English translation (2 pages).

* cited by examiner

*Primary Examiner* — John R Olszewski
*Assistant Examiner* — James M McPherson
(74) *Attorney, Agent, or Firm* — Nixon & Vanderhye PC (57) ABSTRACT

A vehicular control system includes a smart key carried by a user and operated by an embedded battery and a verification ECU mounted in a vehicle. A wireless communication is made between the smart key and the verification ECU. The smart key performs periodically a switchover of a detection sensitivity for detecting a transmission electric wave transmitted from the verification ECU between a normal sensitivity and a high sensitivity. The high sensitivity has a detection area of the transmission electric wave greater than a detection area of the normal sensitivity. The constant use of the high sensitivity is unnecessary to detect the transmission electric wave. This enables a reduction of the consumed electric current of the battery for detecting the transmission electric wave with the high sensitivity.

6 Claims, 10 Drawing Sheets

VEHICULAR CONTROL SYSTEM AND PORTABLE TERMINAL

CROSS REFERENCE TO RELATED APPLICATION

This application is based on Japanese Patent Application No. 2011-222213 filed on Oct. 6, 2011, the disclosure of which is incorporated herein by reference.

TECHNICAL FIELD

The present disclosure relates to a vehicular control system which performs a wireless communication between a portable terminal and an in-vehicle apparatus, and, further relates to a portable terminal.

BACKGROUND

Patent document 1: JP 2000-73635 A (U.S. Pat. No. 6,552,649 B)

A keyless entry system or smart entry system is conventionally known to lock and unlock a door of a vehicle without need of a user inserting a key into a key cylinder.

In the keyless entry system, a user manipulates a button in a key of a portable terminal to thereby transmit a wireless signal; upon receiving the wireless signal, an in-vehicle apparatus locks or unlocks a door of the vehicle.

In contrast, in the smart entry system, an in-vehicle apparatus (smart ECU) mounted in a vehicle transmits a request signal; a smart key (portable terminal) transmits a response signal in response to the request signal. The in-vehicle apparatus collates the received response signal and unlocks and locks a door of the vehicle based on the collation result.

Patent document 1 proposes a vehicular control system that transmits an electric wave of high frequency from an in-vehicle apparatus in order to extend a detection area of a portable transceiver in an area surrounding a vehicle.

Further, Patent document 1 proposes a configuration which has short-range areas and long-range areas larger than the short-range areas in an area surrounding a vehicle. Further, according to a degree of an approach of the portable transceiver towards the vehicle, the short-range areas and the long-range areas are switched therebetween, thereby detecting the approach of the portable transceiver. The short-range area is a reachable region of a short-range use signal carried on electric waves of low frequency. The long-range area is a reachable region of a long-range use signal carried on electric waves of high frequency.

When entering the long-range area where the electric waves of high frequency are transmitted, the portable transceiver replies a reply signal. The in-vehicle apparatus recognizes the reply signal, thereby detecting the portable transceiver. Thus, unnecessary consumption of an in-vehicle battery is prevented because the in-vehicle apparatus switches the detection areas of the portable transceiver.

SUMMARY

The above conventional technology provides several issues. That is, the electric wave of high frequency transmits further than intended; thus, it is not easy to adjust the long-range area. The detection area is switched between the short-range area and the long-range area; thus, it is necessary to switch the transmission and reception manners. This increases costs of the system.

To that end, the sensitivity of the portable transceiver may be raised in order to extend a detection distance while only the electric wave of low frequency is transmitted from the in-vehicle apparatus. However, to raise the sensitivity of the portable transceiver, the consumed electric current of the portable transceiver increased, thereby reducing the battery life of the portable transceiver.

It is an object of the present disclosure to provide a configuration to suppress a decline of a battery life of a portable terminal even when a sensitivity of the portable terminal is raised in a vehicular control system which performs a wireless communication between an in-vehicle apparatus and the portable terminal.

To achieve the above object, according to a first example of the present disclosure, a vehicular control system for a vehicle is provided as follows. A portable terminal is included to be operated with an embedded battery and carried by a user. An in-vehicle apparatus is included to be mounted in the vehicle. The portable terminal and the in-vehicle apparatus perform a wireless communication with each other. The portable terminal performs periodically a sensitivity switchover of a detection sensitivity for detecting a transmission electric wave transmitted from the in-vehicle apparatus between a normal sensitivity and a high sensitivity. Herein, the high sensitivity has a detection area of the transmission electric wave greater than a detection area of the normal sensitivity.

Under the above configuration, the portable apparatus need not detect constantly a transmission electric wave with a high sensitivity in order to extend a detection area of transmission electric wave from the in-vehicle apparatus. This enables a reduction of the consumed electric current of the battery that results from detecting the transmission electric wave with the high sensitivity. The decline of the battery life of the portable terminal can be suppressed.

According to a second example of the present disclosure, a portable terminal carried by a user is provided as follows. An embedded battery is included to be used to perform a wireless communication with an in-vehicle apparatus in a vehicle. A sensitivity switchover portion is included to perform periodically a switchover of a detection sensitivity for detecting a transmission electric wave transmitted from the in-vehicle apparatus between a normal sensitivity and a high sensitivity. Herein, the high sensitivity has a detection area of the transmission electric wave greater than a detection area of the normal sensitivity.

The above configuration of the second example can provide an advantage comparable with that of the first example.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Embodiments of the present disclosure will be explained with reference to drawings. In the embodiments mentioned below, mutually identical or equivalent members are assigned with the same or equal reference numbers.

First Embodiment

A first embodiment according to the present disclosure will be explained with reference to drawings. A vehicular apparatus control system according to the present embodiment is to control a permission or refusal of a user's manipulation to an in-vehicle apparatus based on a wireless communication between the in-vehicle apparatus and a portable terminal. The following will explain a smart entry system as an example of a vehicular control system. In such a case, the in-vehicle apparatus is an apparatus to lock and unlock a door of a vehicle.

Figure 1:
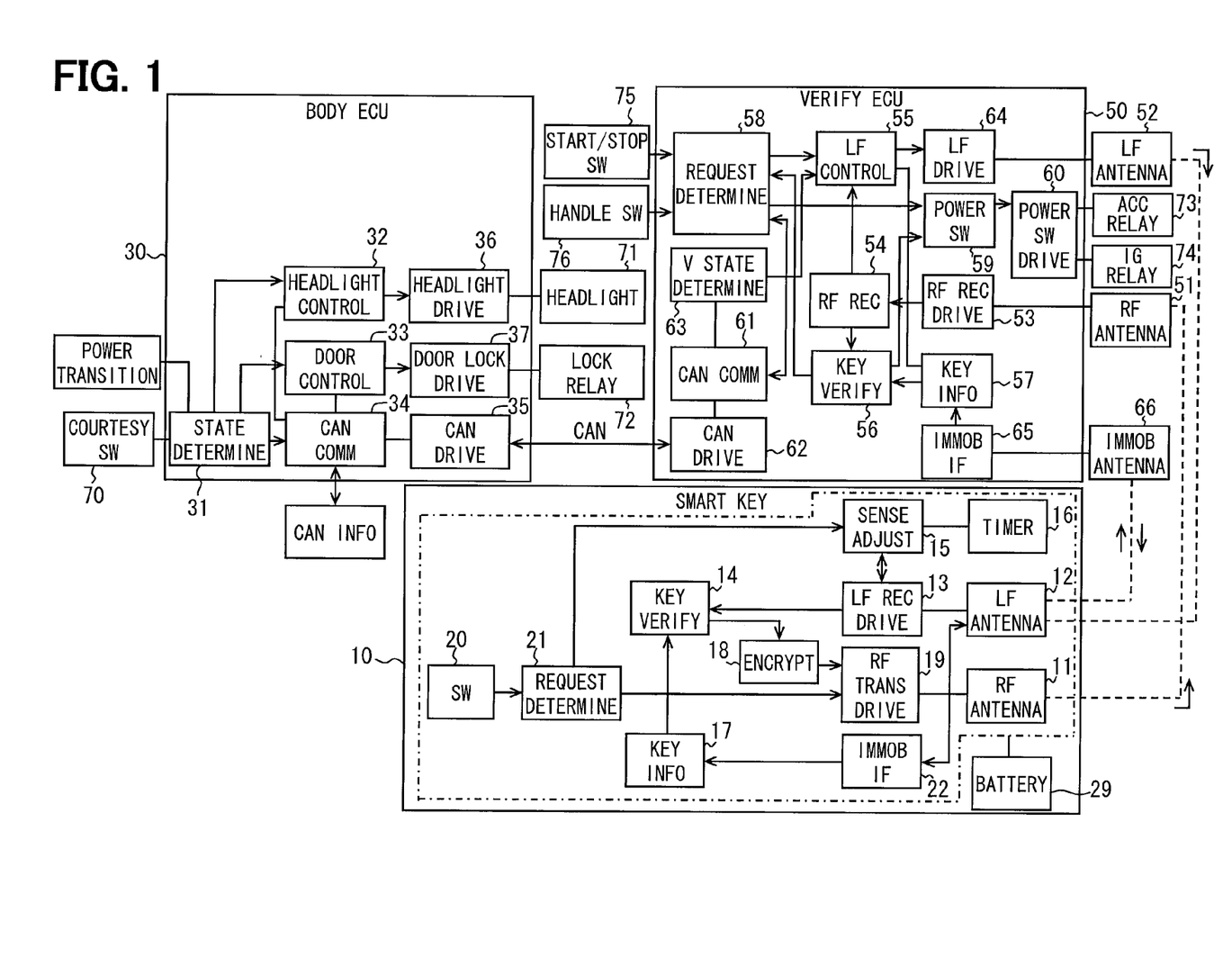
FIG. 1 is a block diagram of a vehicular control system according to a first embodiment of the present disclosure.

FIG. 1 is a block diagram of a vehicular apparatus control system according to the present embodiment. As indicated in FIG. 1, the vehicular control system includes a smart key 10 carried by a user, a body ECU 30 and a verification ECU 50. The smart key 10 operates with an electric power supplied from an embedded battery 29; the body ECU 30 and verification ECU 50 operate with an electric power supplied from an in-vehicle battery as a power source.

It is noted that "ECU (Electrical Control Unit)" is a control circuit in which a microcomputer having CPU, ROM, EEPROM, and RAM (unshown) achieves a predetermined function according to a program stored in the ROM etc. In addition, broken lines in FIG. 1 express "wireless communication."

The smart key 10 is so-called a smart portable terminal for identifying the smart entry system with the in-vehicle verification ECU 50 mounted in the vehicle. The user carries the smart key 10 to thereby enable locking and unlocking of a door of the vehicle.

Such a smart key 10 is equipped with an RF (Radio Frequency) antenna 11 for transmitting electric waves or electric wave signals, and an LF (Low Frequency) antenna 12 for receiving electric waves or electric wave signals. The electric wave signals received via the LF antenna 12 are inputted into the key verification portion 14 via a LF reception driver 13.

The LF reception driver 13 has an amplifier (unshown) for adjusting a sensitivity; the gain of this amplifier is adjusted by an LF reception sensitivity adjustment portion 15. When the current magnitude inputted to the amplifier is increased, a detection sensitivity for detecting the transmission electric wave transmitted from the verification ECU 50 turns into the high sensitivity. When the current magnitude inputted to the amplifier is decreased, the detection sensitivity turns into a predetermined normal or usual sensitivity. The detection area of the transmission electric wave with the high sensitivity is larger than that with the normal sensitivity.

The LF reception sensitivity adjustment portion 15 switches periodically the detection sensitivity between the normal sensitivity and the high sensitivity for detecting the electric wave transmitted from the verification ECU 50, based on the time measurement by a timer 16.

The key verification portion 14 collates or compares key registration information registered in a key registration information portion 17 with information included in the received signal, thereby determining whether the smart key 10 is registered in the verification ECU 50, i.e., determining whether the smart key 10 is verified or unverified. It is noted that the key registration information includes a number or code such as "Key1"; for example, eight numbers such as Key1 to Key8 are registered in the key registration information portion 17.

In addition, the key verification portion 14 encrypts the key registration information with an encryption portion 18 so as to transmit the own key registration information to the verification ECU 50. An encrypted signal is generated and transmitted via the RF transmission driver 19 and RF antenna 11.

Furthermore, when the user manipulates a switch group 20 provided in the smart key 10, the manipulation information is determined by the user request determination portion 21. A request determined by the user request determination portion 21 is transmitted from the RF antenna 11 via the RF transmission driver 19.

The body ECU 30 is for operating an in-vehicle apparatus mounted in the vehicle. This body ECU 30 is equipped with a vehicle state determination portion 31 for determining each power source transition state of a battery voltage (+B), an accessories power source (ACC), and an ignition key (IG), and a state of a courtesy SW 70. The vehicle state determination result of the vehicle state determination portion 31 is used by a headlight control portion 32 or a door lock control portion 33, and outputted to the verification ECU 50 via a CAN (controller area network) data communication portion 34 and a CAN driver 35.

The headlight control portion 32 carries out a light control of a headlight 71 of the vehicle via a headlight driver 36. In addition, a door lock control portion 33 carries out a drive control of a door lock relay 72 of the vehicle via a door lock relay driver 37. The body ECU 30 controls various in-vehicle apparatuses in addition to the headlight 71 and the door lock relay 72, according to user's requests.

In addition, the CAN data communication portion 34 of the body ECU 30 receives vehicle speed CAN information and outputs it to the verification ECU 50 via the CAN driver 35.

The verification ECU 50 communicates key registration information for identifying a smart entry system with the smart key 10 and controls the lock or unlock of a door of the vehicle. Thus, the verification ECU 50 is equipped with an RF antenna 51 for receiving electric waves or electric wave signals, and an LF (Low Frequency) antenna 52 for transmitting electric waves or electric wave signals.

The electric wave received via the RF antenna 51 is decoded in the RF reception processing portion 54 via the RF reception driver 53. The signal acquired in the RF reception processing portion 54 is inputted into the LF drive control portion 55 and the key verification portion 56. The verification ECU 50 is assigned with a fixed detection area for detecting the smart key 10.

The key verification portion 56 collates or compares key registration information registered in a key registration information portion 57 with information included in the received signal, thereby determining whether the smart key 10 of a transmission source of the received electric wave is registered in the verification ECU 50, i.e., determining whether the smart key 10 is verified or unverified. When the smart key 10 is verified by the key verification portion 56, the information included in the received signal is inputted to the user request determination portion 58.

The user request determination portion 58 outputs a determination result to a power switchover control portion 59 in order to operate a user's request from the smart key 10. The power switchover control portion 59 operates an ACC relay 73 and an IG relay 74 by carrying out a drive control of the power switchover relay driver 60 based on the determination result of the user request determination portion 58 and the collation result of the key verification portion 56.

In addition, the user request determination portion 58 outputs the request of the user to the body ECU 30 via the CAN data communication portion 61 and CAN driver 62. Furthermore, the user request determination portion 58 outputs the state of start/stop SW 75 of the vehicle or door handle SW 76 to the body ECU 30 via the CAN data communication portion 61 and CAN driver 62. Thereby, the body ECU 30 operates in-vehicle apparatuses according to the user's request.

The vehicle state determination result from the body ECU 30 is inputted to the vehicle state determination portion 63 of the verification ECU 50 via the CAN driver 62 and the CAN data communication portion 61. This vehicle state determination portion 63 controls an operation of the LF drive control portion 55 based on the vehicle state determination result. Similarly, the user request determination portion 58 also controls an operation of the LF drive control portion 55 according to the state of each switch of the start/stop SW 75 and door handle SW 76.

The LF drive control portion 55 drives the LF transmission driver 64 and transmits a transmission electric wave via the LF antenna 52 so as to transmit the collation result (i.e., verification check result) of the key verification portion 56 to the smart key 10.

Under the above configuration of the smart key 10 and verification ECU 50, an immobilizer communication IF portion 65 and an immobilizer antenna 66 are provided in the verification ECU 50 in order to register the key registration information for identifying each other. The key registration information is registered in the key registration information portion 57 using a tool at the time of manufacturing or shipping out the present vehicular control system. The key registration information on the verification ECU 50 is received by the LF antenna 12 of the smart key 10 via the immobilizer antenna 66, and is registered in the key registration information portion 17 via an immobilizer communication IF 22.

Figure 2:
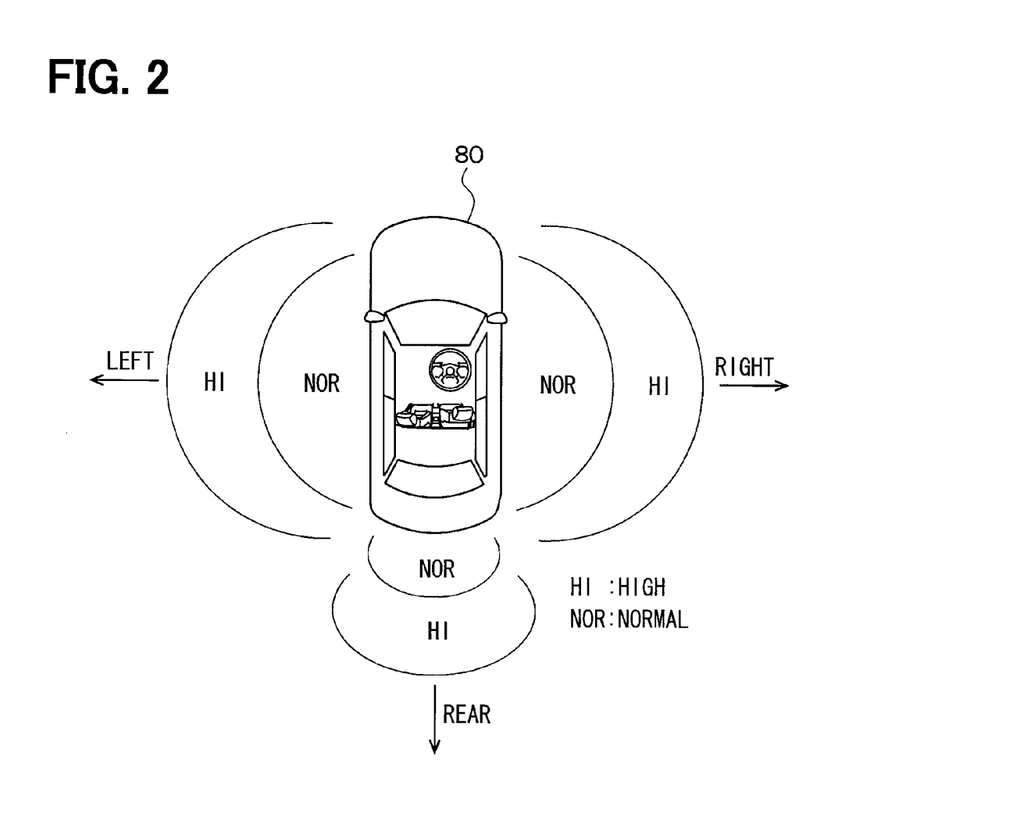
FIG. 2 is a diagram illustrating detection areas of a smart key in vicinity of a vehicle.

FIG. 2 is a diagram illustrating detection areas (right detection area, left detection area, and rear detection area of a vehicle) of the smart key 10 in the vicinity of the vehicle 80. For instance, in a right-hand steering wheel vehicle, the right detection area corresponds to an area outside of the vehicle and adjacent to the driver seat; the left detection area corresponds to an area outside of the vehicle and adjacent to the passenger seat; and the rear detection area corresponds to an area outside of the vehicle and adjacent to the rear bumper. The smart key 10 may be recognized by the verification ECU 50 in the right detection area, left detection area, and rear detection area.

Out of the detection areas illustrated in FIG. 2, areas closer to the vehicle 80 are where the smart key 10 set to the normal sensitivity may be recognized by the verification ECU 50; areas further from the vehicle 80 are where the smart key 10 set to the high sensitivity may be recognized by the verification ECU 50.

The following will explain timing of switchover of the detection sensitivity of the smart key 10 when the smart key 10 approaches the vehicle 80 through the rear detection area (i.e., from behind the rear bumper) with reference to FIGS. 3A, 3B, 4A, 4B.

First, in the present embodiment, the verification ECU 50 switches detection areas in the order of the right detection area adjacent to the driver seat→the left detection area adjacent to the passenger seat→the rear detection area adjacent to the rear bumper. The cycle of polling to switch the detection areas is set to 500 ms (interval between "Wake" and the next "Wake" in FIG. 3A); the transmission time (width) of the transmission electric wave ("Wake" in FIG. 3A) is set to 25 ms.

In contrast, in the smart key 10, the detection sensitivity is periodically switched between the normal sensitivity and the high sensitivity by the LF reception sensitivity adjustment portion 15 using the timer 16. The period of the high sensitivity ("Hi" in FIG. 3A) is set to 525 ms; the period of the normal sensitivity ("Normal" in FIG. 3A) is set to 475 ms.

Figure 3A:
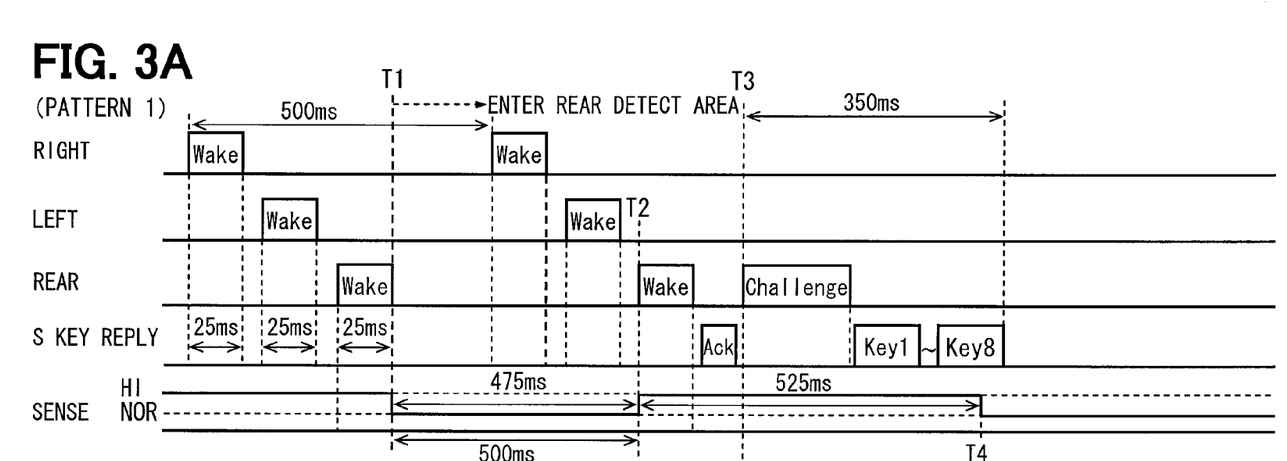
FIGS. 3A, 3B are diagrams illustrating examples of timing charts of changes of a detection sensitivity of a smart key when the smart key approaches the vehicle from behind a rear bumper of the vehicle.

FIG. 3A illustrates Pattern 1 where the smart key 10 enters the rear detection area of the verification ECU 50 from behind the rear bumper of the vehicle 80 at the timing T1 of the sensitivity switchover in the smart key 10, for instance.

Just after the timing T1, the detection sensitivity of the smart key 10 is switched to the normal sensitivity; thus, the verification ECU 50 (i.e., the transmission electric wave "Wake" from the verification ECU 50) is undetectable by the smart key 10. However, when the detection sensitivity of the smart key 10 is switched from the normal sensitivity to the high sensitivity at the timing T2, the smart key 10 is located adjacent to the rear bumper and in the rear detection area of the verification ECU 50. Therefore, the smart key 10 can respond to the verification ECU 50 (return a response "Ack" in FIG. 3A); then, the verification ECU 50 requests a reply of key registration information at the timing T3 ("Challenge" in FIG. 3A).

Then, until 350 ms elapses since the timing T3, the key registration information on Key1 to Key8, which are registered in the verification ECU 50 and the smart key 10, are exchanged, and the verification (i.e., verification check) of the key registration information is performed.

The smart key 10 fixes the detection sensitivity to the normal sensitivity when the smart key 10 is verified (i.e., successfully checked) by the verification ECU 50. That is, the LF reception sensitivity adjustment portion 15 of the smart key 10 fixes the detection sensitivity to the normal sensitivity at the timing T4 of FIG. 3A. The smart key 10 does not need to detect a transmission electric wave from the verification ECU 50 with the high sensitivity after the smart key 10 is verified by the verification ECU 50; thus, the detection sensitivity of the smart key 10 is fixed to the normal sensitivity, reducing the consumed electric current of the battery 29.

Figure 3B:
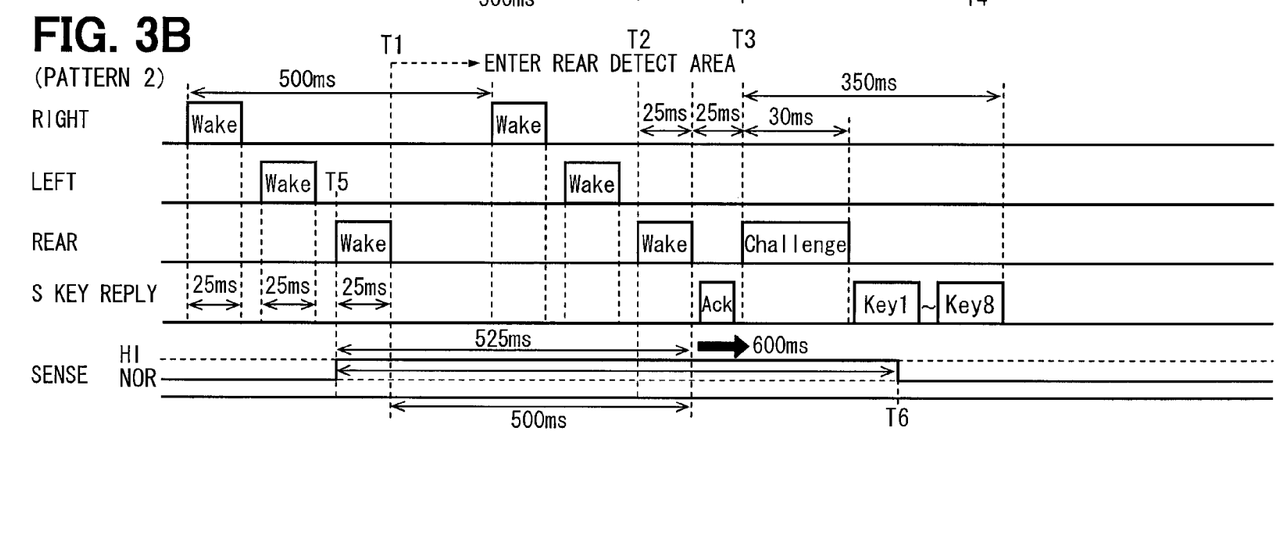

FIG. 3B illustrates Pattern 2 where the detection sensitivity of the smart key 10 switches from the normal sensitivity to the high sensitivity at the timing T5 before the smart key 10 enters the rear detection area of the verification ECU 50 from behind the rear bumper of the vehicle 80, for instance.

Further, the smart key 10 receives the transmission electric wave of the verification ECU 50 during a time interval between 470 ms and 525 ms since the detection sensitivity of the smart key 10 switches over to the high sensitivity at the timing T5. In this case, the time period of the high sensitivity is thereby lengthened to 600 ms.

That is, the smart key 10 enters the rear detection area of the verification ECU 50 at the timing T1 after the timing T5, from behind the rear bumper of the vehicle 80; then, the smart key 10 is located adjacent to the rear bumper and in the rear detection area of the verification ECU 50 at the timing T2. Therefore, the smart key 10 returns a response (Ack) to the verification ECU 50; then, the verification ECU 50 requests a reply of key registration information at the timing T3 ("Challenge" in FIG. 3B).

It is noted that at the timing T3, the smart key 10 continues the response state with the high sensitivity as mentioned above. Then, until the time when 350 ms elapses since the timing T3, the exchange of the key registration information on Key1-Key8 is performed similarly and the verification check of the key registration information is performed.

The key registration information is verified, and the high sensitivity extended to 600 ms is completed at the timing T6. Thereby, the smart key 10 fixes the detection sensitivity to the normal sensitivity at the timing T6.

Figure 4A:
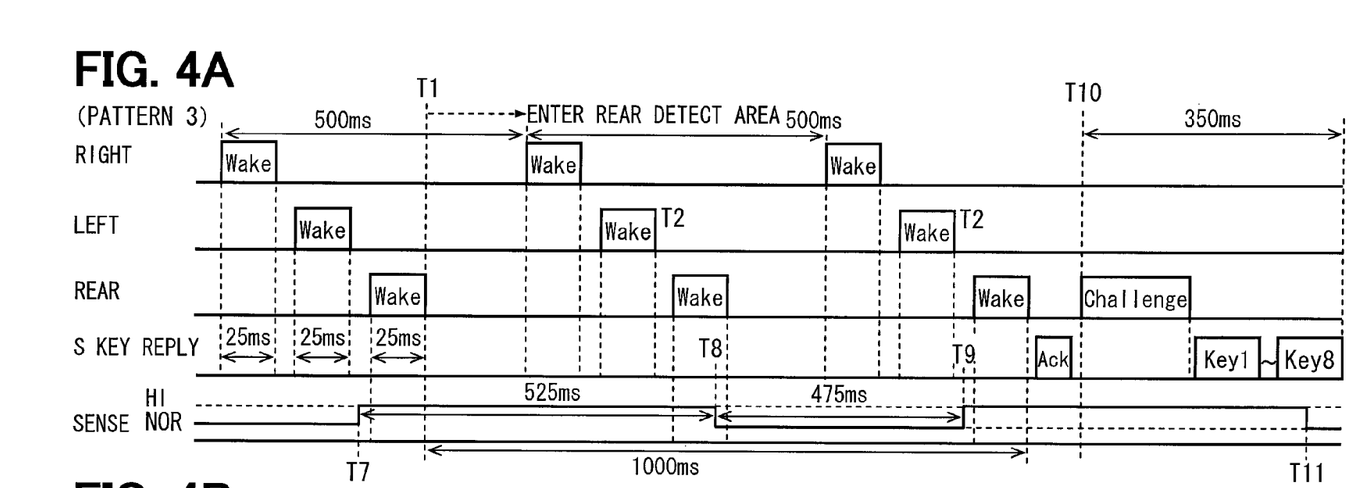
FIGS. 4A, 4B are diagrams illustrating examples of timing charts of changes of a detection sensitivity of a smart key when the smart key approaches the vehicle from behind a rear bumper of the vehicle.
Figure 4B:
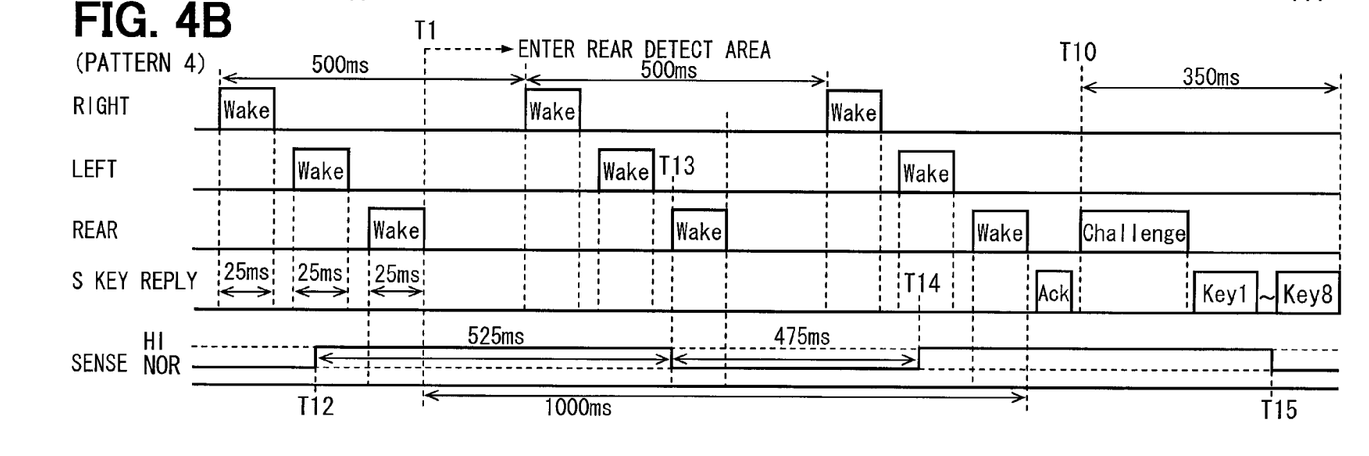

Each pattern illustrated in FIG. 4A and FIG. 4B is an example when the detection timing of the smart key 10 shifts afterward as compared with Patterns 1, 2 in FIGS. 3A, 3B.

FIG. 4A illustrates Pattern 3 where the detection sensitivity of the smart key 10 switches from the normal sensitivity to the high sensitivity at the timing T7 before the smart key 10 enters the rear detection area of the verification ECU 50 from behind the rear bumper of the vehicle 80, for instance.

Thereafter, the smart key 10 enters the rear detection area of the verification ECU 50 at the timing T1 from behind the rear bumper of the vehicle 80. However, the detection sensitivity of the smart key 10 is switched from the high sensitivity to the normal sensitivity at the timing T8 just during a period of the "Wake" by the verification ECU 50 in the rear detection area adjacent to the rear bumper. Thus, the smart key 10 cannot detect the verification ECU 50 (i.e., the electric wave from the verification ECU 50). The smart key 10 comes to detect the verification ECU 50 after the next switchover from the normal sensitivity to the high sensitivity at the timing T9.

The verification ECU 50 requests a reply of key registration information at the timing T10 ("Challenge" in FIG. 4A). Then, until the time when 350 ms elapses since the timing T10, the exchange of the key registration information on Key1-Key8 is performed similarly and the verification check of the key registration information is performed. Thereby, the smart key 10 fixes the detection sensitivity to the normal sensitivity at the timing T11.

In addition, FIG. 4B illustrates Pattern 4 of another example different from Pattern 3. In specific, the detection sensitivity of the smart key 10 switches from the normal sensitivity to the high sensitivity at the timing T12 earlier than the timing T7 of Pattern 3.

Then, the smart key 10 enters the rear detection area of the verification ECU 50 at the timing T1 from behind the rear bumper of the vehicle 80. In this case, the detection sensitivity of the smart key 10 switches from the high sensitivity to the normal sensitivity at the timing T13 before detecting "Wake" in the rear detection area of the verification ECU 50. Thus, the smart key 10 cannot detect the verification ECU 50 (i.e., the electric wave from the verification ECU 50). However, when the detection sensitivity of the smart key 10 is switched again from the normal sensitivity to the high sensitivity at the timing T14, the smart key 10 can detect the verification ECU 50 (i.e., the electric wave from the verification ECU 50). Therefore, the smart key 10 returns a response (Ack) to the verification ECU 50. The verification ECU 50 requests a reply of key registration information at the timing T10 ("Challenge" in FIG. 4B).

Then, similar to Pattern 3, the exchange of the key registration information on Key1-Key8 is performed similarly and the verification check of the key registration information is performed. Thereby, the smart key 10 fixes the detection sensitivity to the normal sensitivity at the timing T15.

As explained above, the smart key 10 switches periodically the detection sensitivity between the normal sensitivity and the high sensitivity (i.e., in a switchover mode), and fixes the detection sensitivity to the normal sensitivity (i.e., a fixed mode) after verifying the verification ECU 50.

Figure 5:
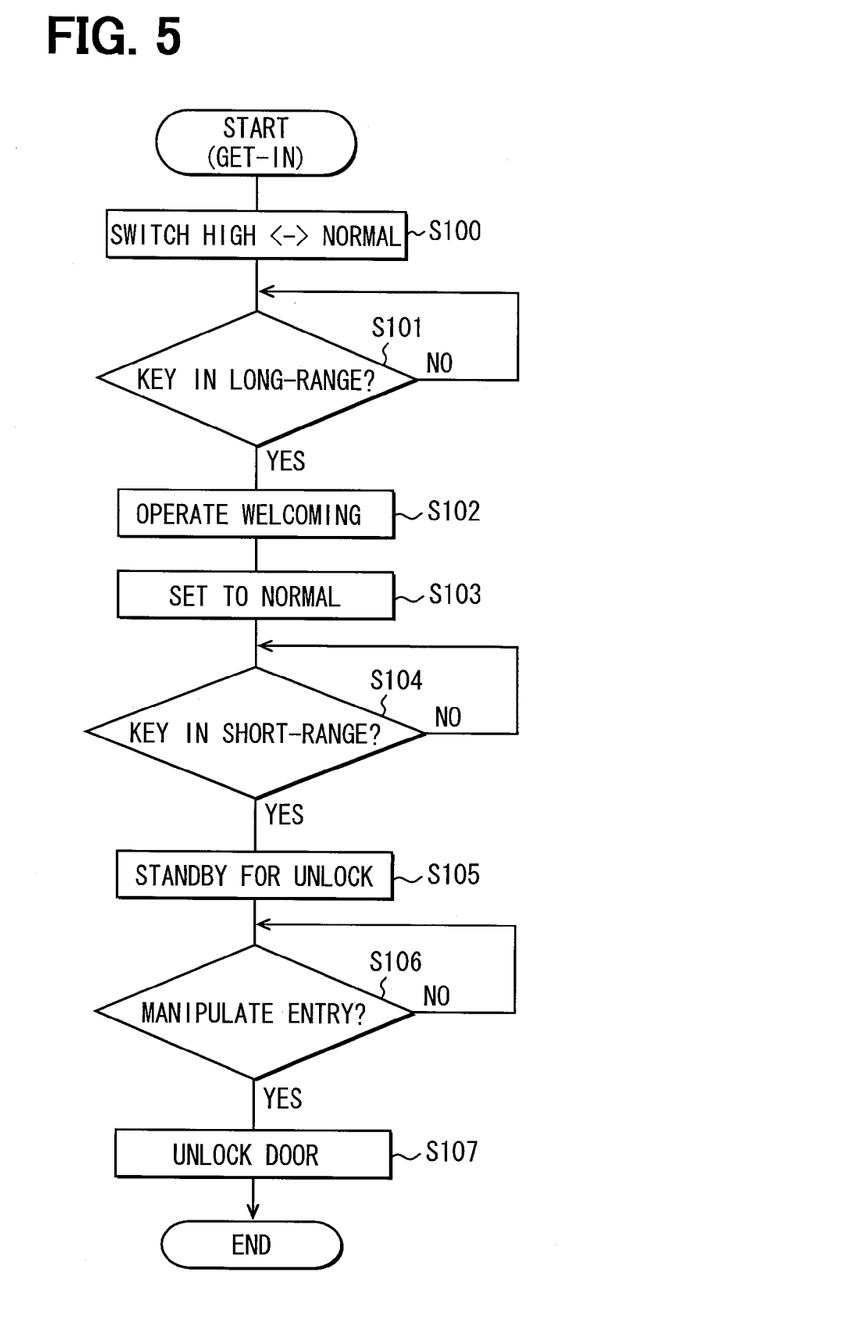
FIG. 5 is a flowchart diagram illustrating a vehicle getting-in process.
Figure 6:
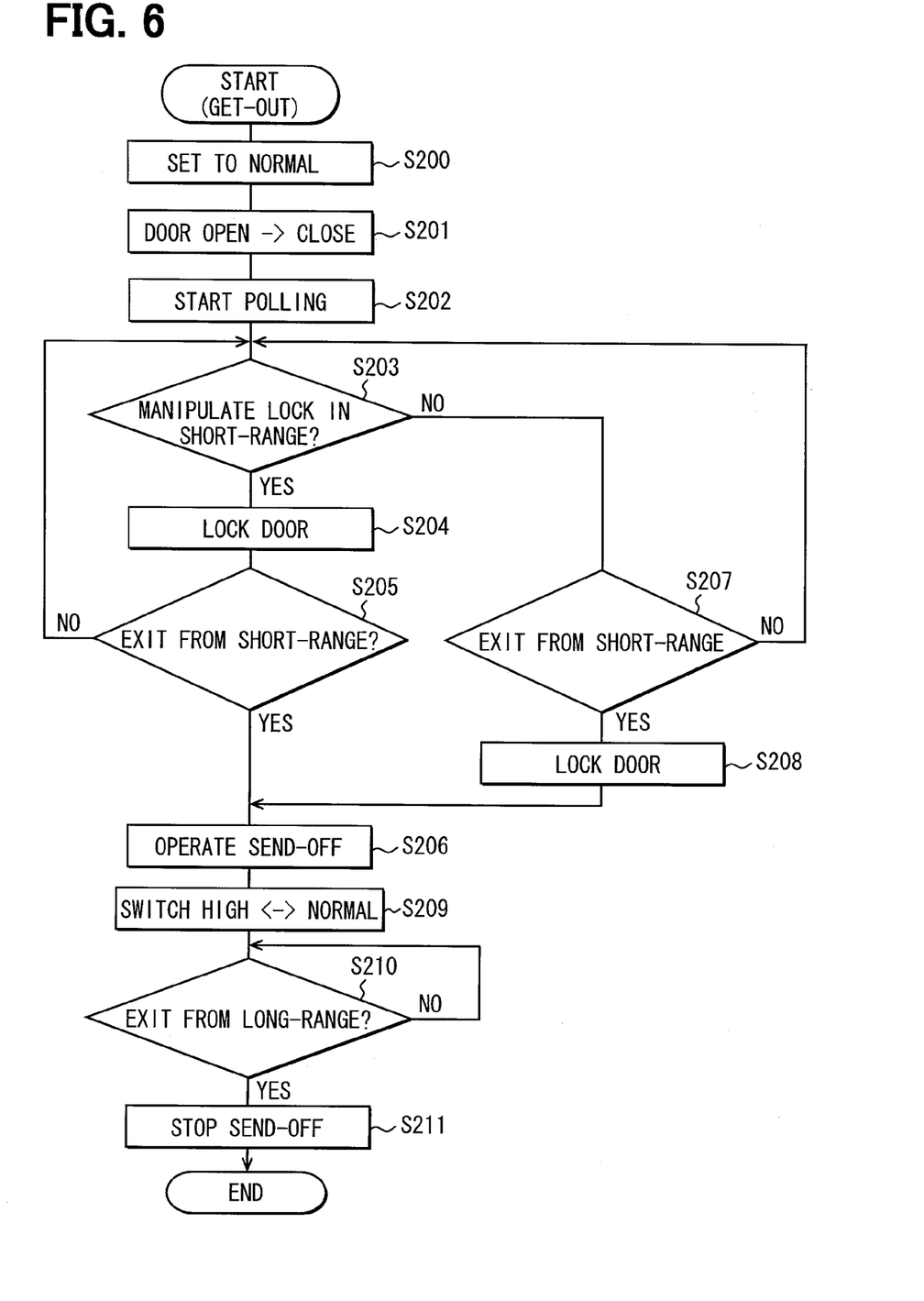
FIG. 6 is a flowchart diagram illustrating a vehicle getting-out process.
Figure 7:
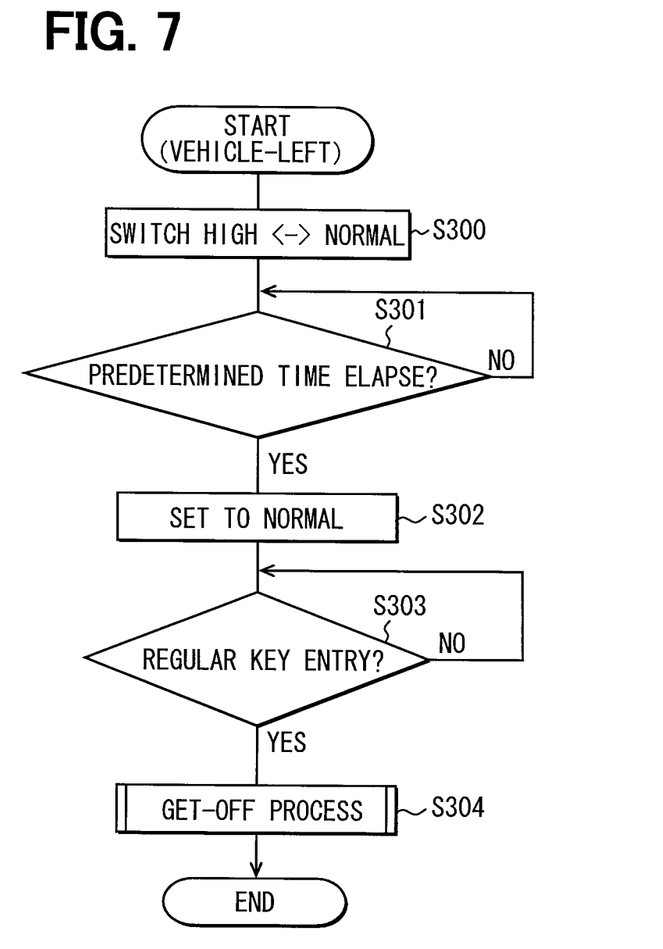
FIG. 7 is a flowchart diagram illustrating a vehicle-left process.

The following will explain a function and operation of the vehicular control system of the above configuration with reference to FIG. 5 to FIG. 7. Each flowchart is started when the vehicular control system is supplied with the electric power.

It is further noted that a sequence, flowchart or the processing of the sequence or flowchart in the present application includes sections (also referred to as steps), which are represented, for instance, as S100. Further, each section can be divided into several sub-sections while several sections can be combined into a single section. Furthermore, each of thus configured sections can be referred to as a device, module, or means and achieved not only (i) as a software section in combination with a hardware unit (e.g., computer), but also (ii) as a hardware section, including or not including a function of a related apparatus. Further, the hardware section may be inside of a microcomputer.

FIG. 5 illustrates a vehicle getting-in process that is a process at the time when a user gets in a vehicle. The time when the user gets in a vehicle signifies a state where the user approaches the vehicle 80 from a position distant from the vehicle 80 to get in the vehicle 80.

As mentioned above, the detection sensitivity of the smart key 10 that is a regular key switches between the normal sensitivity and the high sensitivity (S100). That is, as illustrated in the timing charts of FIGS. 3A, 3B, 4A, 4B, the LF reception sensitivity adjustment portion 15 switches the detection sensitivity alternately between the normal sensitivity and the high sensitivity with predetermined time intervals. It is noted that the regular key signifies a smart key 10 that has the same key registration information as that of the verification ECU 50 mounted in the vehicle 80.

In contrast, the verification ECU 50 determines whether the smart key 10 that is the regular key is present in a long-range area (S101). That is, the verification ECU 50 transmits the transmission electric wave of "Wake" illustrated in the above-mentioned FIGS. 3A, 3B, 4A, 4B, and waits for a response to the transmission electric wave from the smart key 10. It is noted that the long-range area signifies a detection area detectable with the high sensitivity out of the several detection areas of the smart key 10 illustrated in FIG. 2.

When or while the regular key is not located in the long-range area, the verification check is repeated by the verification ECU 50. In contrast, when it is determined that the smart key 10 is located as the regular key in the long-range area, a welcoming function operates in the vehicle 80 (S102). The welcoming function is a control to cause the headlight 71 of the vehicle 80 to turn on, for instance. This is, the verification ECU 50 provides an instruction to perform lighting to the body ECU 30, thereby causing the body ECU 30 to perform a light control of the headlight 71.

In contrast, in the smart key 10 that is verified as the regular key, the detection sensitivity is fixed to the normal sensitivity (S103). This refrains the electric wave detection with the high sensitivity which consumes relatively the electric current, thereby suppressing the decline of the life of the battery 29 of the smart key 10.

Then, it is determined whether the smart key 10 which is the regular key is in the short-range area by the verification ECU 50 (S104). It is noted that the short-range area signifies a detection area detectable with the normal sensitivity out of the detection areas of the smart key 10 illustrated in FIG. 2. In this short-range area, the verification ECU 50 transmits the transmission electric wave of "Wake," and waits for a response to this transmission electric wave from the smart key 10.

When or while the regular key is not located in the short-range area, the verification check is repeated by the verification ECU 50. Then, the smart key 10 may be determined to be located as the regular key in the short-range area. In this case, a door unlock becomes in a standby state in the vehicle 80 (S105). That is, based on a prior verification, the verification ECU 50 provides an instruction of to the standby state for door unlocking to the body ECU 30.

Next, the body ECU 30 determines whether a user performs an entry manipulation (S106). For instance, the body ECU 30 detects the entry manipulation by determining whether a touch sensor (unshown) is touched by the user, for example.

When or while the user's entry manipulation is not detected, the body ECU 30 waits for the entry manipulation repeatedly. When the user performs an entry manipulation, the body ECU 30 unlocks the door of the vehicle 80 (S107). Thereby, the user can open the door of the vehicle 80. In this way, the vehicle getting-in process is completed.

The following will explain a vehicle getting-out process at a time when a user gets out a vehicle with reference to FIG. 6. The time when the user gets out a vehicle signifies a state where the user moves to separate away from the vehicle 80.

As mentioned above, the detection sensitivity of the smart key 10 that is verified as the regular key is fixed in the normal sensitivity (S200) at the present instant. The door is shut by the user's manipulation or the like (S201). Furthermore, the verification ECU 50 starts the LF polling, i.e., transmitting the transmission electric wave of "Wake" (S202).

Then, it is determined whether the user, who holds the smart key 10 that is the regular key, performs a lock manipulation in the short-range area (S203). That is, the user's manipulation for the smart key 10 is transmitted to verification ECU 50, and the content of the manipulation is determined by the user request determination portion 58 of the verification ECU 50. When the user's request is to request the door lock, the request instruction of the door lock is issued from the verification ECU 50 to the body ECU 30, and the door lock is carried out by the body ECU 30 (S204).

The, in the state where the door is locked, it is determined by the verification ECU 50 whether the smart key 10 which is the regular key is moved to a position outside the short-range area (S205). When it is determined that the smart key 10 which is the regular key is not moved to a position outside the short-range area, it is determined again whether the lock manipulation is performed in the short-range area (S203). When it is determined that the smart key 10 which is the regular key is moved to a position outside the short-range area, the verification ECU 50 causes the body ECU 30 to operate a send-off function (S206).

In contrast, when it is determined that a lock manipulation is not performed by the user, who holds the smart key 10 which is the regular key, in the short-range area (S203), it is determined by the verification ECU 50 whether the smart key 10 which is the regular key is moved to a position outside the short-range area (S207). When it is determined that the smart key 10 which is the regular key is not moved to a position outside the short-range area, it is determined again whether the lock manipulation is performed in the short-range area (S203). When the verification ECU 50 determines that the smart key 10 is moved to a position outside the short-range area, the request instruction of the door lock is issued or made from the verification ECU 50 to the body ECU 30, and the door lock is carried out by the body ECU 30 (S208). Then, the verification ECU 50 causes the body ECU 30 to operate a send-off function (S206).

It is noted that above determination as to whether the smart key 10 is moved to a position outside the short-range area is made as follows. That is, when determining that the smart key 10 is not existing in the vehicular compartment or in the short-range area of the vehicle 80, it is determined that the smart key 10 is moved to a position outside the short-range area. In addition, the send-off function causes the body ECU 30 to perform a light control of the headlight 71, for example.

As explained above, when the smart key 10 which is the regular key comes out of a detection area of the verification ECU 50, the smart key 10 is switched from the fixed mode, where which the detection sensitivity is fixed to the normal sensitivity, to the switchover mode, where the detection sensitivity is switched between the normal sensitivity and the high sensitivity periodically (S209). When the user holding the smart key 10 moves to separate away from the vehicle 80, the detection area of the smart key 10 becomes large periodically, while helping prevent the reduction of the life of the battery 29 of the smart key 10.

Then, it is determined whether the smart key 10 which is the regular key is moved to a position outside the long-range area by the verification ECU 50 (S210). When the regular key is not moved to a position outside the long-range area, the determination at S210 is repeated by the verification ECU 50.

In contrast, when it is determined that the regular key is moved to a position outside the long-range area, the operation of the send-off function is stopped (S211). That is, the body ECU 30 performs a light putting-out control to put out the headlight 71. Thus, when the user is moved to a position away from the vehicle 80, the vehicle getting-out process is completed.

The following will explain a vehicle-left process with reference to FIG. 7. The vehicle-left process is a process performed when the user approaches the vehicle 80 after a long period elapses since the user is moved to a position separate from the vehicle 80.

First, since the smart key 10 is separated from the vehicle, the smart key 10 which is the regular key is in the switchover mode where the detection sensitivity is switched between the normal sensitivity and the high sensitivity (S300). It is then determined whether a predetermined time period elapses since the smart key 10 is moved to a position separate from the vehicle, i.e., since the user gets out the vehicle (S301). The predetermined time period may be designated as units of days such as one day or two days, for instance.

When the predetermined time period elapses since the getting-off of the vehicle, the detection sensitivity of the smart key 10 which is the regular key is fixed to the normal sensitivity (S302). In specific, when the timer 16 measures the predetermined time period for which the verification ECU 50 has not been verified by the key verification portion 14 of the smart key 10, the detection sensitivity is fixed to the normal sensitivity by the LF reception sensitivity adjustment portion 15.

Then, the verification ECU 50 determines whether an entry to the vehicle 80 is made by the smart key 10 which is the regular key (S303). That is, the verification ECU 50 determines whether the smart key 10 is moved to a position in the short-range area. As mentioned above, the detection sensitivity of the smart key 10 is fixed in the normal sensitivity at the present instant; thus, the verification ECU 50 cannot detect the smart key 10 until the smart key 10 enters the short-range area. In this regard, however, in the state where the smart key 10 is not verified by the verification ECU 50 for a long time period, the detection sensitivity is fixed in the normal sensitivity; therefore, the decline of the battery life of the smart key 10 can be suppressed over the long time period.

Thus, the verification ECU 50 waits for the entry of the smart key 10. When the entry of the smart key 10 is detected, the verification ECU 50 proceeds to the vehicle getting-out process (S304) that is the same as illustrated in FIG. 6. This returns the detection mode of the detection sensitivity in the smart key 10 to the switchover mode where the normal sensitivity and the high sensitivity is switched periodically. Thus, when the smart key 10 is verified by the verification ECU 50 again, the detection area of the smart key 10 can be periodically made large. Thus, the vehicle-left process is completed.

As mentioned above, the present embodiment is characterized in that the detection sensitivity of the smart key 10 is switched alternately between the normal sensitivity and the high sensitivity. This configuration eliminates the necessity of the constant detection of the transmission electric wave by the smart key 10 with the high sensitivity, thereby enabling a reduction of the consumed electric current of the battery 29 for detecting the transmission electric wave with the high sensitivity. Therefore, the decline of the battery life of the smart key 10 can be suppressed.

Further, the present embodiment is characterized in that when the smart key 10 is verified as a regular key by the verification ECU 50, the detection sensitivity of the smart key 10 is fixed to the normal sensitivity. Thus, after the smart key 10 is verified by the verification ECU 50, there is no need to detect the transmission electric wave, i.e., "Wake", from the verification ECU 50 with the high sensitivity. The battery life of the smart key 10 can be thus prolonged by fixing the detection sensitivity to the normal sensitivity.

The smart key 10 may be referred to as a portable terminal. The verification ECU 50 may be referred to as an in-vehicle apparatus. The LF reception sensitivity adjustment portion 15 of the smart key 10 may be referred to as a sensitivity switchover portion, device, or means. The key verification portion 14 of the smart key 10 may be referred to as a verification portion, device, or means. Furthermore, the timer 16 of the smart key 10 may be referred to as a measurement portion, device, or means.

Second Embodiment

Furthermore, the following will explain a second embodiment of the present disclosure with respect to only portions different from the first embodiment. In the above first embodiment, the transmission electric wave "Wake" of the verification ECU 50 is transmitted in the order of the right detection area (i.e., adjacent to the driver seat)→the left detection area (adjacent to the passenger seat)→the rear detection area (adjacent to the rear bumper). In the present embodiment, the verification ECU 50 transmits three transmission electric waves "Wakes" to all the three detection areas, simultaneously. This will be explained with reference to timing charts of FIGS. 8A, 8B and FIGS. 9A, 9B.

Further, in the present embodiment, the verification ECU 50 transmits transmission electric wave ("Wake") to each of the detection areas of the right detection area, the left detection area, and the rear detection area, simultaneously. The transmission cycle of the transmission electric waves is designated as 500 ms, and the transmission time period (width) of one transmission electric wave is designated as 25 ms. In addition, it is supposed that the smart key 10 approaches the vehicle 80 from behind the rear bumper of the vehicle 80.

Figure 8A:
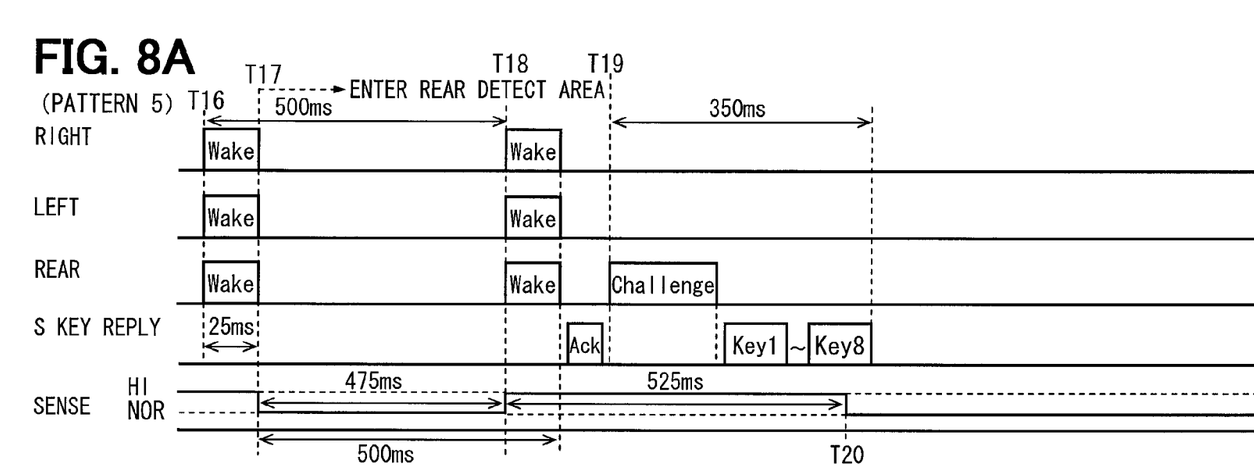
FIGS. 8A, 8B are diagrams illustrating examples of timing charts of changes of a detection sensitivity of a smart key when the smart key approaches the vehicle from behind a rear bumper of the vehicle according to a second embodiment.

FIG. 8A illustrates Pattern 5 where the transmission electric waves ("Wakes") are simultaneously transmitted to the three detection areas from the verification ECU 50 at the timing T16 before the smart key 10 enters the detection area (i.e., the rear side area out of the detection areas) of the verification ECU 50 from behind the rear bumper of the vehicle 80.

Simultaneously when the smart key 10 enters the detection area (i.e., the rear side area) of the verification ECU 50 at the timing T17, the detection sensitivity of the smart key 10 is switched from the high sensitivity to the normal sensitivity. In this case, the detection sensitivity of the smart key 10 is set to the normal sensitivity. Thus, even if entering the rear detection area of the verification ECU 50, the smart key 10 cannot detect the verification ECU 50 (i.e., the transmission electric wave from the verification ECU 50).

Then, simultaneously when the transmission electric waves ("Wakes") are transmitted at the same time to each of the detection areas from the verification ECU 50 at the timing T18, the detection sensitivity of the smart key 10 switches from the high sensitivity to the normal sensitivity. Thereby, the smart key 10 returns a response (Ack) to the verification ECU 50; then, the verification ECU 50 requests a reply of key registration information at the timing T19 ("Challenge" in FIG. 8A).

The key registration information of Key1 to Key8 is verified and the high sensitivity is then finished at the timing T20. Thereby, the smart key 10 fixes the detection sensitivity to the normal sensitivity at the timing T20.

Figure 8B:
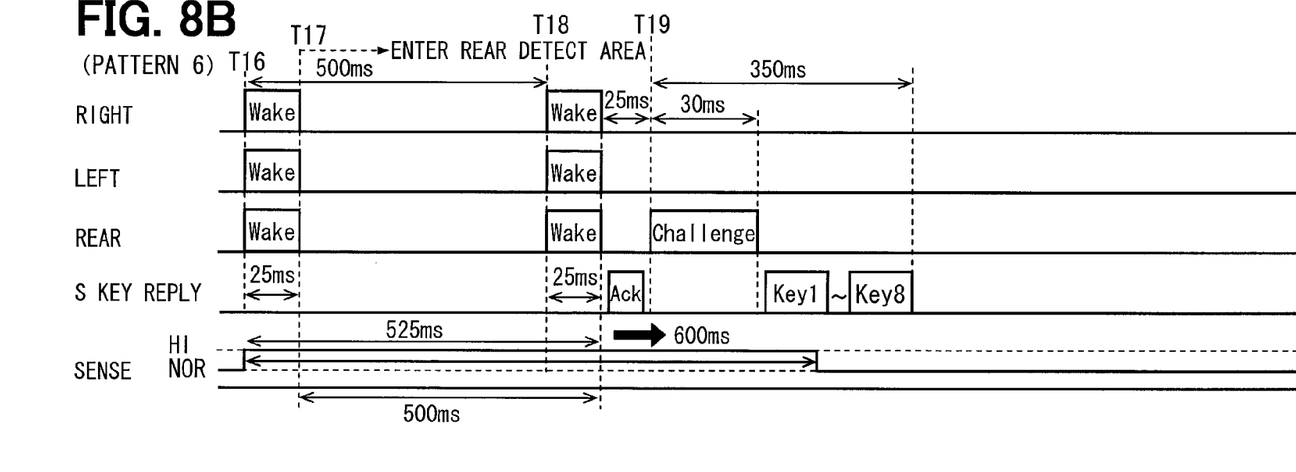

FIG. 8B illustrates Pattern 6 where the detection sensitivity of the smart key 10 switches from the normal sensitivity to the high sensitivity at the timing T16 before the smart key 10 enters the rear detection area of the verification ECU 50 from behind the rear bumper of the vehicle 80.

In this case, during a time interval between 470 ms and 525 ms since the detection sensitivity of the smart key 10 switches over to the high sensitivity at the timing T16, the smart key 10 receives the transmission electric wave of the verification ECU 50. The time period of the high sensitivity is thereby lengthened to 600 ms.

That is, as the smart key 10 enters the detection area of the verification ECU 50 at the timing T17 (after the timing T16) from behind the rear bumper of the vehicle 80, the smart key 10 returns a response (Ack) to the transmission electric wave transmitted at the timing T18. Then, the verification ECU 50 requests a reply of key registration information at the timing T19 ("Challenge" in FIG. 8B). It is noted that at the timing T19, the smart key 10 continues the response state with the high sensitivity as mentioned above. Then, until the time when 350 ms elapses since the timing T19, the exchange of the key registration information on Key1-Key8 is performed similarly and the verification of the key registration information is performed.

Figure 9A:
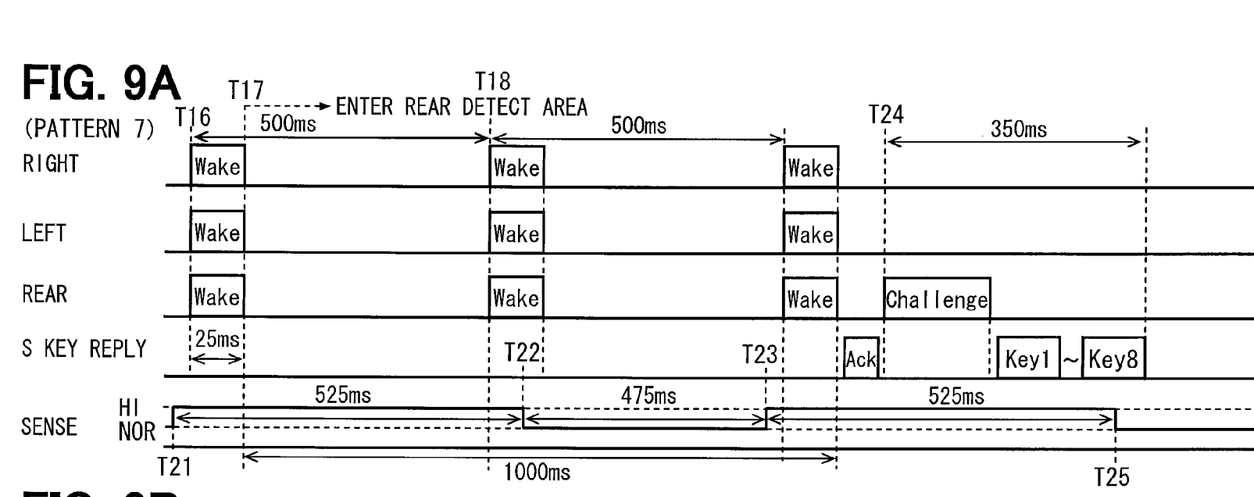
FIGS. 9A, 9B are diagrams illustrating examples of timing charts of changes of a detection sensitivity of a smart key when the smart key approaches the vehicle from behind a rear bumper of the vehicle according to a second embodiment.
Figure 9B:
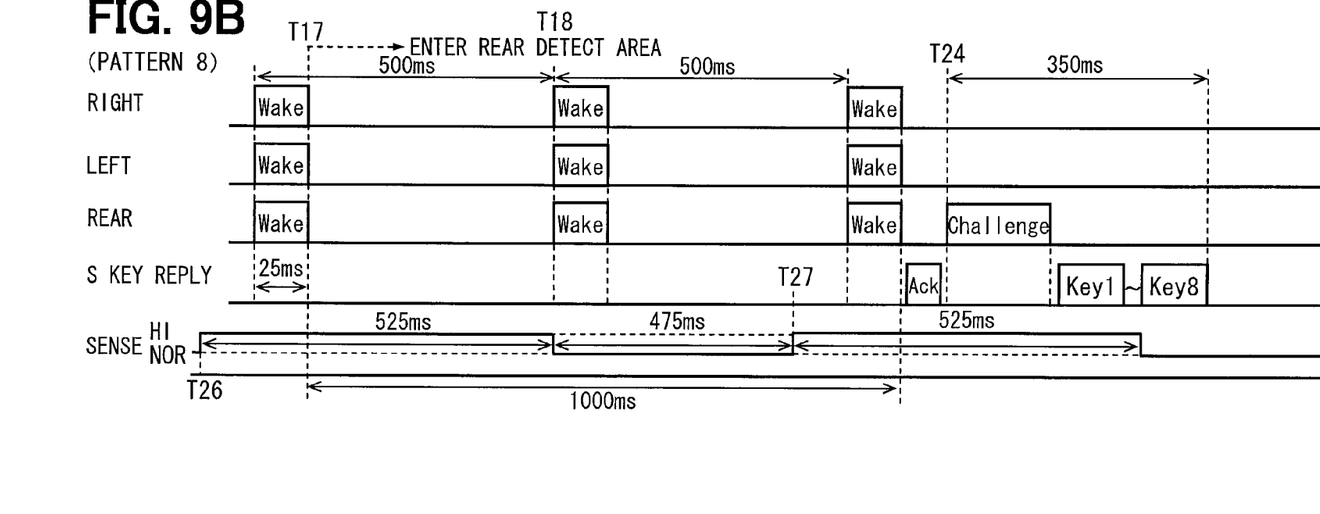

Patterns 7, 8 illustrated in FIG. 9A and FIG. 9B are examples when the detection timing of the smart key 10 shifts afterward, similar to Patterns 3, 4 in FIGS. 4A, 4B.

FIG. 9A illustrates Pattern 7 where the detection sensitivity of the smart key 10 is switched from the normal sensitivity to the high sensitivity at the timing T21 before the transmission electric wave is transmitted from the verification ECU 50.

Then, the transmission electric wave is transmitted from the verification ECU 50 at the timing T16. The smart key 10 enters the rear detection area of the verification ECU 50 at the timing T17 after the timing T16 from behind the rear bumper of the vehicle 80. The verification ECU 50 transmits a transmission electric wave at the timing T18. In this regard, however, the detection sensitivity of the smart key 10 switches from the high sensitivity to the normal sensitivity at the timing T22; thereby, the smart key 10 cannot return a response (Ack), as illustrated in FIG. 9A. Thus, the smart key 10 returns a response (Ack) after the timing T23 when the detection sensitivity of the smart key 10 switches over to the high sensitivity again. Then, the verification ECU 50 requests a reply of key registration information at the timing T24 ("Challenge" in FIG. 9A). Then, until the time when 350 ms elapses since the timing T24, the exchange of the key registration information on Key1-Key8 is performed similarly and the verification of the key registration information is performed. Thereby, the smart key 10 fixes the detection sensitivity to the normal sensitivity at the timing T25.

In addition, FIG. 9B illustrates Pattern 8 as another example different from Pattern 7. In specific, the detection sensitivity of the smart key 10 switches from the normal sensitivity to the high sensitivity at the timing T26 earlier than the timing T21 of Pattern 7.

The smart key 10 enters the rear detection area of the verification ECU 50 at the timing T17 from behind the rear bumper of the vehicle 80. Thereafter, the verification ECU 50 transmits a transmission electric wave at the timing T18; however, the detection sensitivity of the smart key 10 switches from the high sensitivity to the normal sensitivity at the same timing T18. Thus, the smart key 10 cannot return a response (Ack), as illustrated in FIG. 9B. Thus, the smart key 10 returns a response (Ack) to the transmission electric wave from the verification ECU 50 after the timing T27 when the detection sensitivity of the smart key 10 switches over to the high sensitivity again. The subsequent is the same as Pattern 7.

As mentioned above, even in cases that the transmission electric waves (Wakes) from the verification ECU 50 are simultaneously transmitted to more than one detection areas, the switchover of the detection sensitivity of the smart key 10 is performed.

Third Embodiment

Furthermore, the following will explain a third embodiment of the present disclosure with respect to only portions different from the first embodiment. As illustrated in FIG. 4A in the first embodiment and FIG. 9A, when the detection sensitivity of the smart key 10 switches from the high sensitivity to the normal sensitivity just during a time period for which the transmission electric wave (Wake) is transmitted from the verification ECU 50, the smart key 10 does not respond. In other words, when the detection sensitivity of the smart key 10 switches from the high sensitivity to the normal sensitivity before the time period (width) of transmitting the transmission electric wave (Wake) is entirely completed, the smart key 10 cannot not respond to the Wake.

Figure 10:
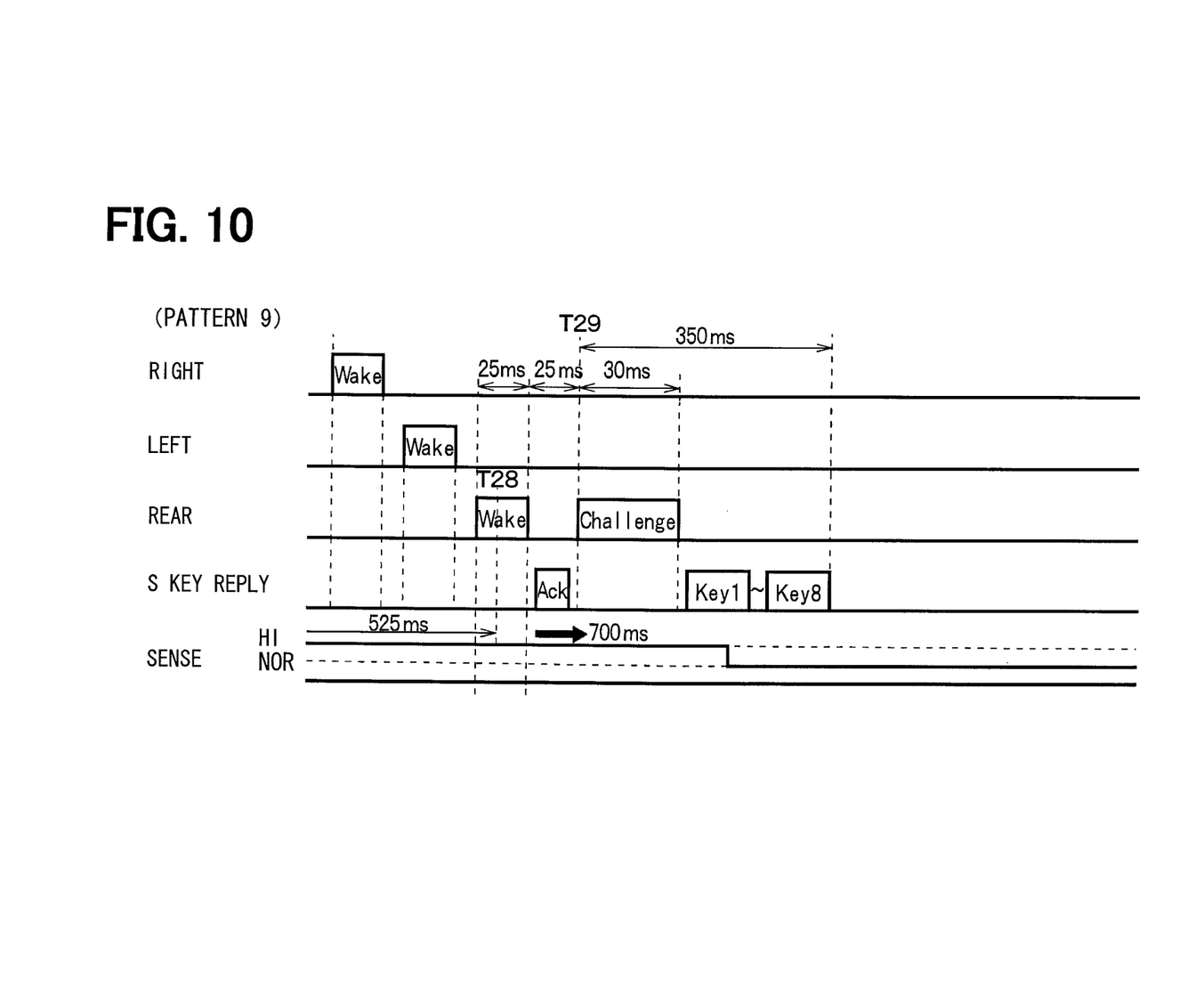
FIG. 10 is a diagram illustrating a timing chart of changes of a detection sensitivity of a smart key according to a third embodiment.

The present third embodiment is characterized as illustrated in FIG. 10. That is, the timing when the detection sensitivity of the smart key 10 switches from the high sensitivity to the normal sensitivity may come just in a middle of a time period for which the transmission electric wave (Wake) is transmitted from the verification ECU 50. In such a case, the time period of the high sensitivity is lengthened from 525 ms to 600 ms. Thereby, the smart key 10 can return a response (Ack) to the verification ECU 50 during the lengthened time period; then, the verification ECU 50 can request a reply of key registration information at the timing T29 ("Challenge" in FIG. 10) also during the lengthened time period.

Thus, when the transmission electric wave (Wake) from the verification ECU 50 is detected by the smart key 10 in the state where the detection sensitivity is set to the high sensitivity, the time period of the high sensitivity may be lengthened.

Other Embodiments

The above explains only an example of the configuration of the vehicular control system. Without need to be limited thereto, another configuration may be adopted to achieve the present disclosure. The above embodiments explain the cases when the smart key 10 approaches the vehicle 80 from behind the rear bumper of the vehicle 80. When the smart key 10 may approach from the right detection area (i.e., an area adjacent to the driver seat in a right-hand steering wheel vehicle) or the left detection area (i.e., an area adjacent to the passenger seat), a similar configuration may be achieved.

The third embodiment explains the case where the verification ECU 50 transmits a transmission electric wave ("Wake") in the order of the right detection area→the left detection area→the rear detection area. The third embodiment can also explain the case where the transmission electric waves are transmitted simultaneously to the three detection areas, like in the second embodiment.

As mentioned above, the above embodiments provide the configuration where the detection sensitivity of the smart key 10 is switched between the high sensitivity and the normal sensitivity. In such a configuration, when the user pushes a wireless lock/unlock SW of the smart key 10, the detection sensitivity of the smart key 10 may be fixed to the normal sensitivity.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicular control system for a vehicle, the system comprising:
    a portable terminal operated with an embedded battery and to be carried by a user; and
    an in-vehicle apparatus mounted in the vehicle,
    the portable terminal performing a wireless communication with the in-vehicle apparatus in a wave-detection state where the portable terminal detects a transmission electric wave that is transmitted from the in-vehicle apparatus,
    the portable terminal selecting either a sensitivity periodic-switchover mode or a sensitivity fixed mode, to change an operating power of the portable terminal,
    the sensitivity periodic-switchover mode switching periodically a sensitivity switchover of a detection sensitivity for detecting the transmission electric wave from the in-vehicle apparatus between a first sensitivity and a second sensitivity, the second sensitivity having a detection area of the transmission electric wave greater than a detection area of the first sensitivity, the second sensitivity being higher than the first sensitivity, the sensitivity fixed mode fixing the detection sensitivity to the first sensitivity, the sensitivity periodic-switchover mode using the operating power greater than the operating power that the sensitivity fixed mode uses, the sensitivity periodic-switchover mode being selected to be performed until the portable terminal is verified by the in-vehicle apparatus in the wave-detection state, the sensitivity fixed mode being selected to be performed, by being switched from the sensitivity periodic-switchover mode to reduce the operating power, either (a) when the portable terminal is verified by the in-vehicle apparatus in the wave-detection state during the sensitivity periodic-switchover mode, or (b) when the portable terminal has been unverified by the in-vehicle apparatus for a predetermined time period during the sensitivity periodic-switchover mode.

2. The vehicular control system according to claim 1, wherein the portable terminal returns from the sensitivity fixed mode to the sensitivity periodic-switchover mode when exiting from the detection area of the in-vehicle apparatus.

3. The vehicular control system according to claim 1, wherein after the sensitivity fixed mode is selected to be performed when the portable terminal has been unverified by the in-vehicle apparatus for the predetermined time period during the sensitivity periodic-switchover mode, the portable terminal switches from the sensitivity fixed mode to the sensitivity periodic-switchover mode when the portable terminal is verified by the in-vehicle apparatus.

4. A portable terminal carried by a user, the portable terminal comprising:

an embedded battery used to perform a wireless communication with an in-vehicle apparatus in a vehicle in a wave-detection state where a transmission electric wave transmitted from the in-vehicle apparatus is detected;

a sensitivity switchover portion to select either a sensitivity periodic-switchover mode or a sensitivity fixed mode, to change a power consumed in the embedded battery, the sensitivity periodic-switchover mode switching periodically a detection sensitivity for detecting the transmission electric wave from the in-vehicle apparatus between a first sensitivity and a second sensitivity, the second sensitivity having a detection area of the transmission electric wave greater than a detection area of the first sensitivity, the second sensitivity being higher than the first sensitivity, the sensitivity fixed mode fixing the detection sensitivity to the first sensitivity, the sensitivity periodic-switchover mode using the power in the embedded battery greater than the power in the embedded battery that the sensitivity fixed mode uses;

a verification portion to verify the in-vehicle apparatus in the wave-detection state; and a time measurement portion to measure a time, wherein:

the sensitivity periodic-switchover mode is selected to be performed until the in-vehicle apparatus is verified by the verification portion; and the sensitivity fixed mode is selected to be performed, by being switched from the sensitivity periodic-switchover mode to reduce the power consumed in the embedded batter, either:

(a) when the in-vehicle apparatus is verified by the verification portion during the sensitivity periodic-switchover mode, or (b) when the time measurement portion measures a predetermined time period for which the in-vehicle apparatus is unverified by the verification portion during the sensitivity periodic-switchover mode.

5. The portable terminal according to claim 4, wherein the sensitivity switchover portion returns from the sensitivity fixed mode to the sensitivity periodic-switchover mode when the in-vehicle apparatus becomes unverified by the verification portion resulting from exiting from the detection area of the in-vehicle apparatus.

6. The portable terminal according to claim 4, wherein:

after the sensitivity fixed mode is selected to be performed when the time measurement portion measures the predetermined time period for which the in-vehicle apparatus is unverified by the verification portion during the sensitivity periodic-switchover mode, the sensitivity switchover portion switches from the sensitivity fixed mode to the sensitivity periodic-switchover mode when the in-vehicle apparatus is verified by the verification portion.

* * * * *